United States Patent [19]

Karasaki et al.

[11] Patent Number: 4,662,735
[45] Date of Patent: May 5, 1987

[54] PLASTIC LENS ELEMENTS SUPPORTING STRUCTURE

[75] Inventors: Toshihiko Karasaki, Sakai; Hiroshi Ueda, Habikino; Michihiro Shintani, Osaka; Katsuhiko Akagi, Yao, all of Japan

[73] Assignee: Minolta Camera Kabushiki Kaisha, Osaka, Japan

[21] Appl. No.: 818,971

[22] Filed: Jan. 15, 1986

[51] Int. Cl.⁴ .................. G03B 3/00; G02B 7/02; B32B 7/12; F16B 17/00
[52] U.S. Cl. .................. 354/406; 350/245; 156/92; 156/275.7; 403/388; 403/406.1
[58] Field of Search .................. 354/406–408; 250/204; 350/169, 245; 156/92, 91, 275.7; 403/388, 393, 405.1, 406.1

[56] References Cited

U.S. PATENT DOCUMENTS 4,526,458 7/1985 Kawamura et al. .................. 354/406
4,529,287 7/1985 Karasaki et al. .................. 354/406

FOREIGN PATENT DOCUMENTS

58-88709 5/1983 Japan .
58-106511 6/1983 Japan .

Primary Examiner—William B. Perkey
Attorney, Agent, or Firm—Watson, Cole, Grindle & Watson

[57] ABSTRACT

In a focus detection of a camera a pair of imaging lens elements are formed of a transparent plastic material as a part of a plastic plate. A supporting structure for support of the lens elements is provided with a pair of bosses projecting from a base body to loosely fit in a pair of boss receiving holes formed on the plastic plate. An adhesive is applied to the top ends of the bosses and one of the plate surfaces of the plastic plate which does not face the base body. As the plastic plate is fixed to the base body only by the adhesive, freedom for the plastic plate to expand and contract due to temperature changes is improved and residual deformation of the plastic plate which affects the distance between the lens elements is minimized.

13 Claims, 15 Drawing Figures

PLASTIC LENS ELEMENTS SUPPORTING STRUCTURE

BACKGROUND OF THE INVENTION

1. Field of the Invention

The present invention relates to a plastic lens elements supporting structure and more particularly to a plastic lens elements supporting structure which will not deteriorate due to temperature changes when applied to such a device as a focus detecting device for a camera in which a pair of lens elements are required to be compactly arranged and to keep their positional accuracy for a long time.

2. Description of the Prior Art

Figure 1:
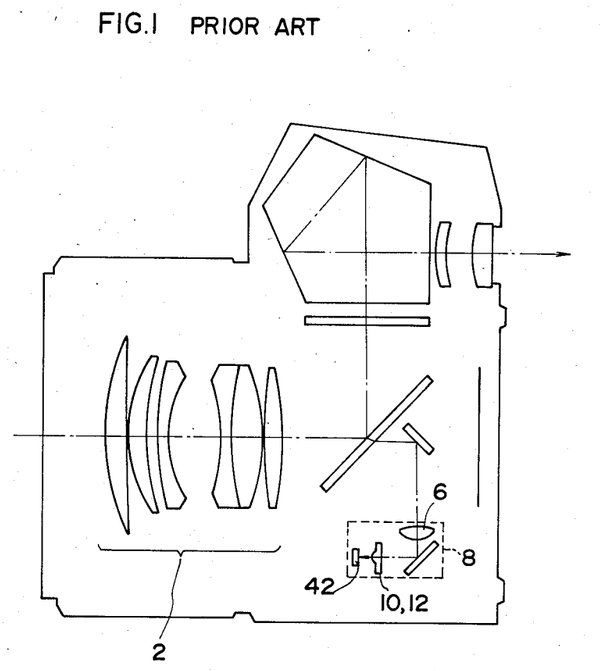
FIG. 1 is a schematic side view of a known focus detection device of the phase difference detection type as employed in a single lens reflex camera.
Figure 2:
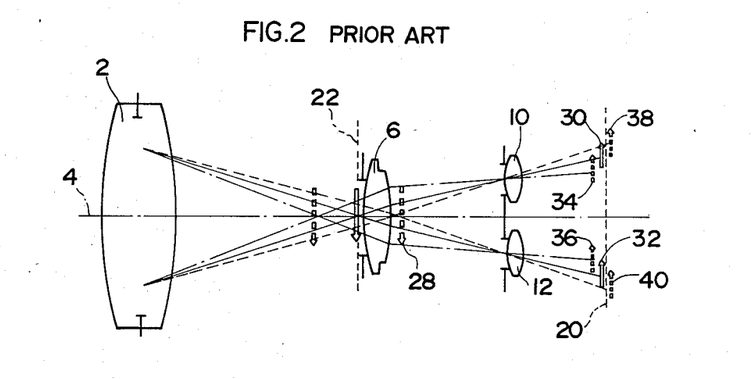
FIG. 2 is an illustration of a basic optical arrangement of the known focus detection device.

FIG. 2 shows a focus detection optical system of a known focus detecting device for a camera disclosed in, for example, U.S. Pat. Nos. 4,526,458 and 4,529,287. Referring to the drawing, 10 and 12 denote plastic image forming lens elements formed into an integral body, 2 denotes an objective lens, and 6 denotes a condenser lens. The condenser lens 6 and the elements on the right thereof are arranged into a single unit denoted by 8 in FIG. 1 to be mounted in a camera. From FIG. 1, it will be understood how strongly miniaturization of the focus detecting device is demanded and how advantageous it is to form the image forming lens elements of a plastic material into an integral body.

According to the known focus detecting device, a primary image 28 of an object is formed by the objective lens 2. The primary image is reimaged as a pair of secondary images 30 and 32 (or 34 and 36 or 38 and 40) by the image forming lens elements 10 and 12 and sensed by image sensing means (not shown in FIG. 12). The distance between the secondary images varies with the focus condition of the objective lens 2, i.e., the position of the primary image 28 relative to a predetermined focal plane 22 of the objective lens. The device detects the distance between the secondary images based on the output of the image sensing means, compares the detected distance with a reference distance which is the distance of the secondary images in an in-focus condition and then calculates the amount of defocus of the primary image 28, i.e., the amount of deviation of the primary image 28 from the predetermined focal plane 22, in acccordance with the comparison result, i.e., the difference between the detected distance and the reference distance.

Figure 3:
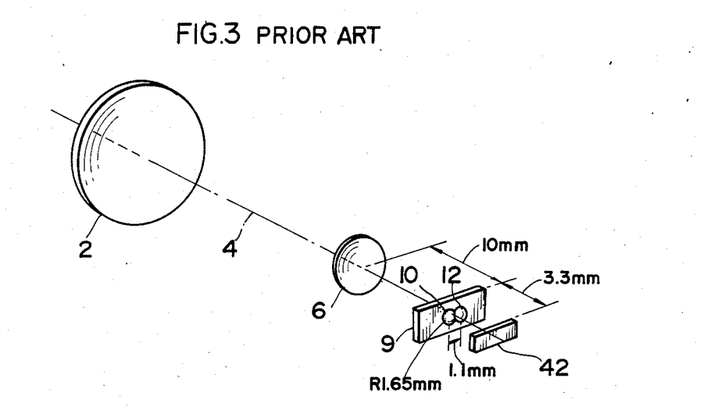
FIG. 3 is a developed perspective view of the known focus detection device.

By the way, the secondary images are formed in the relative position as indicated by 30 and 32 in FIG. 2 in the in-focus condition, as indicated by 34 and 36 in a front-focus condition, and as indicated by 38 and 40 in a rear-focus condition. Such a focus detection system will hereinafter be called the phase difference detection type for convenience. When the focus detection unit 8 made up of the condenser lens 6, the image-forming lens elements 10, 12, and a photosensor array 42 as the above mentioned image sensing means is to be incorporated into the body of a single-lens reflex camera as shown in FIG. 1 (for example, at the lower portion of a not shown mirror box), it will be advantageous if the image-forming lens elements 10 and 12 are formed of a plastic material into an integral body since the unit 8 can then be structured into a compact module. However, since plastics in general have coefficient of linear expansion $10^3$ to $10^4$ times as large as that of glass (in case of acrylic resin, for example, the value of the coefficient is $6 \times 10^{-5}/°C.$), the effect of the changes in the temperature on the focus detection becomes too large to be neglected if the image-forming lens elements 10 and 12 are formed of a plastic material into an integral body. More specifically, change in ambient temperature causes change in the distance between the image-forming lens elements. In the case of a device of the dimensions as indicated in FIG. 3, for example, the distance between the lens elements will be increased by 2 μm when the temperature rises by 30° C. If this change in the distance is, for example, converted into the deviation amount of the image formed by the objective lens 2 from the predetermined focal plane 22, it will correspond to the magnitude of the deviation amount as large as 68 μm. A camera is generally used within a temperature range from −20° C. to +40° C. (and sometimes beyond this range) and, in the case of a single-lens reflex camera, focus detecting accuracy as high as ±50 μm is generally demanded. For accurate focus detection, therefore it is necessary to compensate the effect of the change in the distance between the lens elements due to thermal expansion. A method for such compensation employing an electrical circuit arrangement has been proposed in Ishida et al U.S. patent application Ser. No. 731, 453 filed on May 6, 1985, and assigned to the same assignee.

Figure 4:
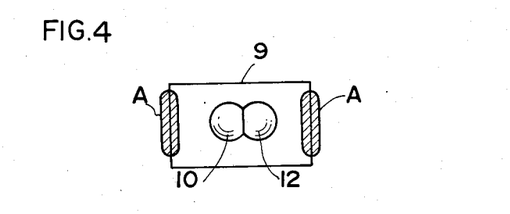
FIG. 4 is a plan view of the plastic plate 9 shown in FIG. 3 with an adhesive A applied to the opposite ends of the plate in the direction in which the lens elements 10, 12 are lined up.
Figure 5:
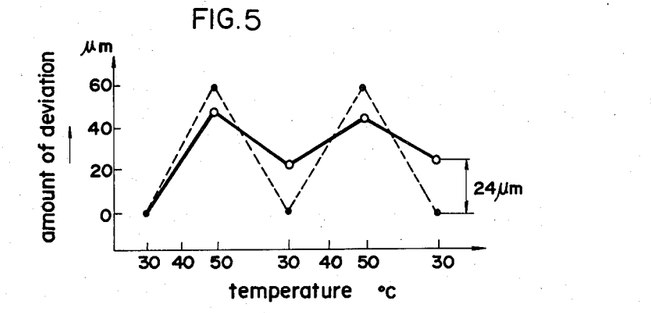
FIG. 5 is a graph indicating changes in the amount of deviation of a focused object image from the predetermined focal plane due to the temperature changes as plotted on the abscissa, wherein the solid line represents the change in the amount of deviation obtained by an actual measurement in the case where the plate 9 is fixedly attached to a base body by the adhesive A as shown in FIG. 4 whereas the dotted line represents the changes in the amount of deviation obtained by a simulation based on an assumption that the plate 9 is supported in a completely free state.

In the invention of the above mentioned patent application, it was assumed that there was an invariable relationship between the distance between the image-forming lens elements 10 and 12 and the ambient temperature. However, it has become apparent that the relationship between the lens-to-lens distance and the ambient temperature is complex and unsteady in the case where a plastic plate which is formed of a plastic material integrally with the image-forming lens elements 10 and 12 is fixed to a base body with an adhesive. FIG. 5 is a graph, in which the amount of deviation of a focused object image from the predetermined focal position is represented in the ordinate against the schedule of changes in the temperature plotted on the abscissa. The change in the amount of deviation obtained by an actual measurement is indicated by the solid line whereas the change in the amount of deviation obtained by a simulation based on an assumption that the plate 9 is supported in a completely free state is indicated by the dotted line. The measurement was made with the plastic plate 9 integral with the lens elements 10 and 12 fixedly attached to the base body with the adhesive A at the opposite ends thereof as shown in FIG. 4. Changes in the temperature from 30° C. to 50° C. and then back to 30° C. for one round produced residual deformation corresponding to 24 μm in terms of the amount of deviation of the object image from the predetermined focal position. The measured values were deviated from the results of the simulation throughout the process of the temperature changes. The amount of deviation as indicated by the dotted line can be compensated for by the electrical compensation method of the above Ishida et al U.S. patent application. However, even with such a compensation, the difference between the solid line and the dotted line becomes the error in the focus detection. Meanwhile, an adhesive is advantageous as means for fixedly attaching the plate 9 to the base body 13 because it not only contributes to reduction of the number of mechanical parts such as screws but also improves workability in attaching the plate to the base body. However, in the case of the attaching method of FIG. 3 in which the adhesive A is applied to the opposite end portions of the plate 9, the adhesive inevitably gets into a space between the plate 9 and the base body 13 to thereby form an adhesive layer which serves to shift the position of the plate 9 and thus those of the lens elements 10 and 12 in the direction of the optical axis. Such a position shift accidentally changes the distance between the two images formed on the photosensor array 42, resulting in failure of accurate focus detection.

SUMMARY OF THE INVENTION

It is an object of the present invention to provide an improved lens elements supporting structure in which an adhesive is used for attaching a plastic plate member integral with a pair of plastic lens elements to a base body without causing the problems as mentioned above.

According to a lens elements supporting structure of the present invention, a pair of imaging lens elements for forming images to be sensed for focus detection are formed of a transparent plastic material as a part of a plastic plate member which has at least one through-hole penetrating the opposite plate surfaces thereof. At least one projection carried on a base body is loosely fitted in the through-hole with one of the opposite plate surface of the plastic plate member facing the base body. The plastic plate member is fixed to the base body by an adhesive applied to the top end of the projection and to the other of the opposite plate surfaces of the plastic plate member which does not face the base body. The supporting structure of the present invention is free from such a problem that adhesive gets into a space between the plastic plate member and the base body to thereby form an adhesive layer there since the adhesive is put only at the side of the surface of the plastic plate member which does not face the base body. Further, the supporting structure of the present invention allows thermal expansion of the plastic plate member within the range of the play in the fitting between the projection and the through-hole, so that it can provide the plastic plate member with improved freedom to expand and contract due to temperature changes, minimizing residual deformation of the plastic plate member which affects the distance between the lens elements and accordingly the accuracy of the focus detection.

The above and other objects and features of the present invention will become more apparent from the following description of preferred embodiments of the present invention taken in conjunction with the accompanying drawings.

BRIEF DESCRIPTION OF THE DRAWINGS

FIGS. 6. to 8 show a lens elements supporting structure according to a first embodiment of the present invention, wherein FIG. 6 is an enlarged cross sectional view of an essential part of the structre of the first embodiment while

FIGS. 12 to 14 show a lens supporting structure according to a second embodiment of the present invention, wherein FIG. 12 is an enlarged perspective view of an essential part of the structure of the second embodiment while FIGS. 13 and 14 are an exploded perspective view and a side elevation view partially in section of the same structure, respectively.

DESCRIPTION OF PREFERRED EMBODIMENTS

Preferred embodiments of the present invention are hereinafter described with reference to FIGS. 6 to 14. wherein the parts which are the same as or corresponding to those shown in FIGS. 1 to 5 are designated by the same reference numerals.

Figure 6:
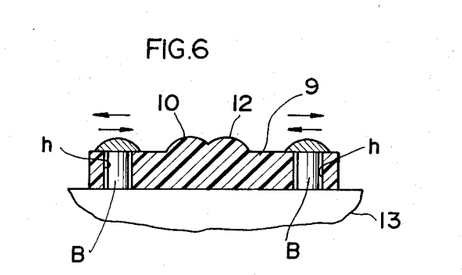
Figure 7:
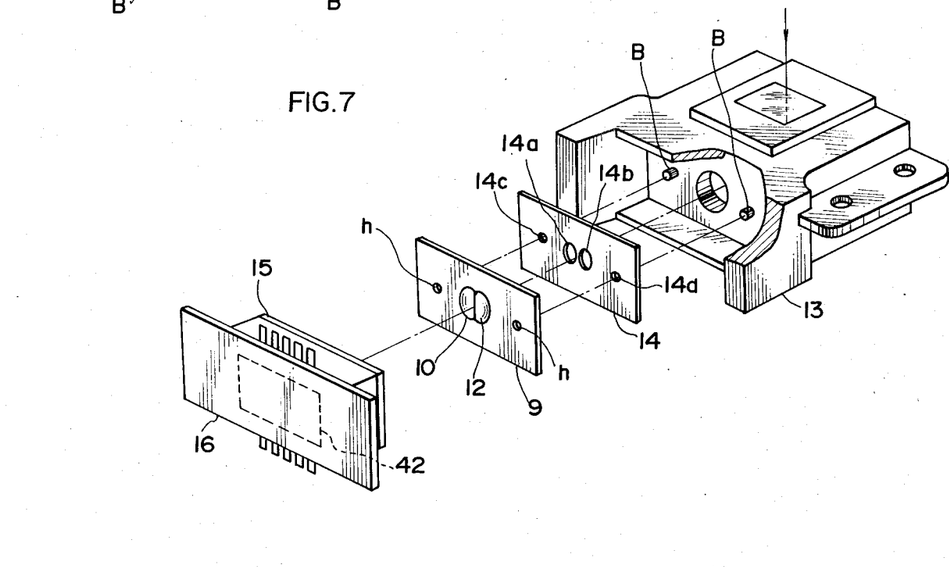
FIGS. 7 and 8 are an exploded perspective view and a plan view partially in section of the same structure, respectively.
Figure 8:
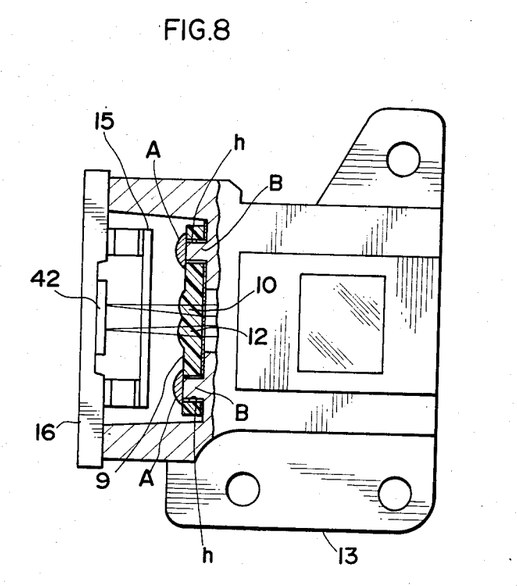

FIGS. 6 to 8 show a plastic lens elements supporting structure of the first embodiment of the present invention applied to the focus detecting unit 8 as shown in FIG. 1. Referring to FIG. 7, 13 denotes a base body within which a condenser lens 6 and a mirror for folding the optical axis at right angles are incorporated. Denoted by 14 is a diaphragm plate formed with two vertically elongated openings 14a, 14b corresponding to a pair of plastic lens elements 10, 12. The plastic lens elements 10, 12 are formed of an acrylic resin integrally with a plate 9 as a part thereof. The plate 9 is formed with two through-holes as boss receiving holes h, h disposed at both end portions thereof in the direction in which the lens elements 10 and 12 are lined up. Corresponding to these boss receiving holes, there are formed two projections as bosses B, B on the side of a base body 13. In assembling these parts, two holes 14c, 14d provided in the diaphragm plate 14 at both end portions thereof are first put on the bosses B, B, and then, the boss receiving holes h, h of the plate 9 are put on the bosses B, B. The bosses B, B are loosely fitted in the boss receiving holes h, h and the top ends of the bosses B, B are adapted to become flush with one surface of the plate 9 (on which the lens elements are formed) when the diaphragm plate 14 and the plate 9 put on the bosses B, B are put together as shown in FIG. 6. With the plate 9 kept in this state, an adhesive A is applied to the positions between the two ends of the bosses B, B and the surface of the plate 9. The adhesive is of the type which is hardened or cured by irradiation of a ultraviolet ray and which requires no heat for hardening. Such an adhesive provides good workability. It is desirable in general that the adhesive has the coefficient of linear thermal expansion almost equal to that of the plastic used as the lens material. For the lens materials such as acrylic resin, polycarbonate resin, or the like, modified acrylic system adhesive is suitable. After the adhesive has been hardened, a back cover 16 is fitted to the base body 13 to finish the assembling work. On the back cover 16 are fitted a photosensor array 42, a transparent cover 15 in front thereof, and others.

Figure 9:
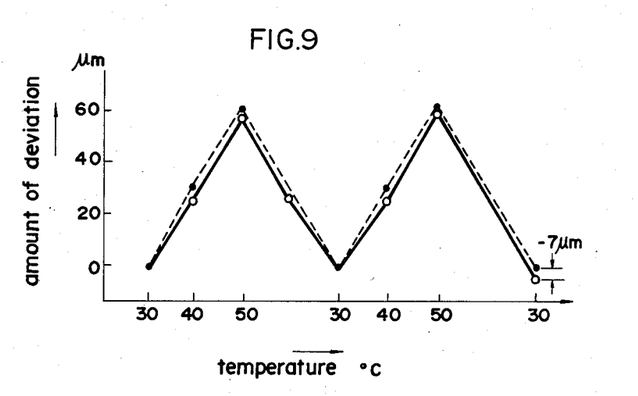
FIG. 9 is a graph similar to that of FIG. 5, wherein the solid line represents the change in the amount of deviation obtained by an actual measurement in the case of the structure of the first embodiment while whereas the dotted line represents the same change as that represented by the dotted line in FIG. 5.

FIG. 8 shows, in cross-section, the device in the state as assembled. It is seen that the plate 9 is fixed to the bosses B, B with the adhesive A only at the top ends of the bosses and the surface of the plate 9 formed with the lens elements 10, 12 and freedom for the plate 9 to expand and contract in the direction in which the lens elements 10, 12 are lined up is ensured. The expansion is allowed within the range of the play in the fitting between the boss receiving holes and the bosses. Thus the plate 9 is supported by the base body 13 in a substantially free state and therefore no force which might produce a residual stress exerts on the plate 9 upon thermal expansion and contraction of the same plate. FIG. 9 is a graph showing the effect of the present embodiment, which indicates considerably good agreement between the result of the simulation and the measured values, that is, the amount of deviation of a focused image from the predetermined focal plane is as small as below ⅜ of the result as shown in FIG. 5 which was obtained with the plate 9 directly attached at its both ends to the base body by an adhesive as shown in FIG. 4. According to the present structure, there is produced no such problem that the adhesive gets in between the plate 9 and the base body 13 to thereby form an adhesive layer there and to cause the position of the lens elements 10, 12 along the optical axis to be shifted from the designed value by the thickness of the adhesive layer.

Figure 10:
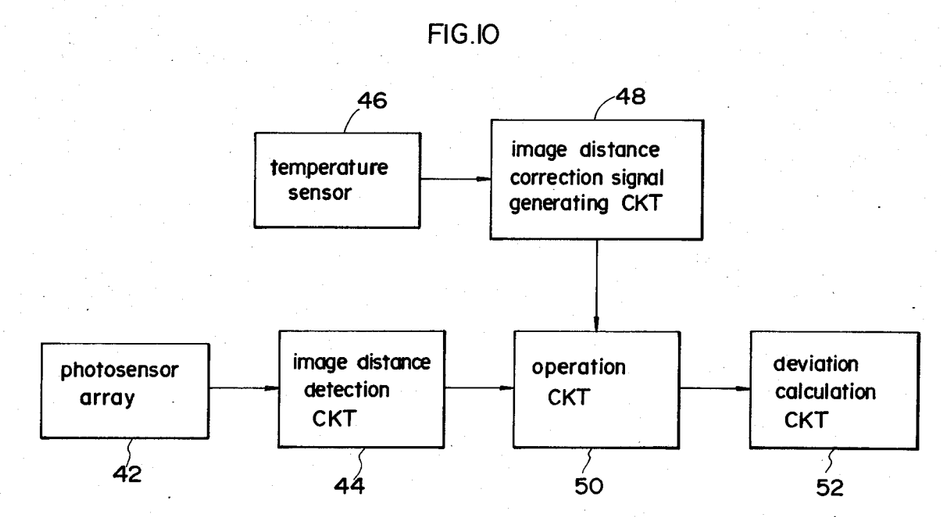
FIG. 10 is a block diagram of a circuit arrangement of the focus detection device to which the structure of the first embodiment is applied.

FIG. 10 is a block diagram of a circuit arrangement of a focus detection device to which the supporting structure of the first embodiment is applied. The circuit arrangement is the same as that proposed in FIG. 7 of the above mentioned U.S. patent application Ser. No. 731,453 in the form of a flow chart. In FIG. 10, 44 denotes a detecting circuit responsive to a signal output by the photosensor array 42 for detecting the distance between the two images as shown in FIG. 46 denotes a temperature sensor for sensing the ambient temperature, 48 is an image-to-image distance correction signal generating circuit for generating an image-to-image distance correction signal varying with the temperature sensed by the temperature sensor 46, 50 denotes an operation circuit for compensating the image-to-image distance signal from the image-to-image distance detecting circuit 44 with the correction signal from the circuit 48 and generating a compensated image-to-image distance signal, and 52 denotes a deviation calculation circuit responsive to the compensated image-to-image distance signal for claculating the deviation amount.

By the way, in order to compensate the deviation amount for the temperature change, the circuit arrangement disclosed in FIG. 9 of the above mentioned U.S. patent application Ser. No. 731,453 may also be employed.

Figure 11A:
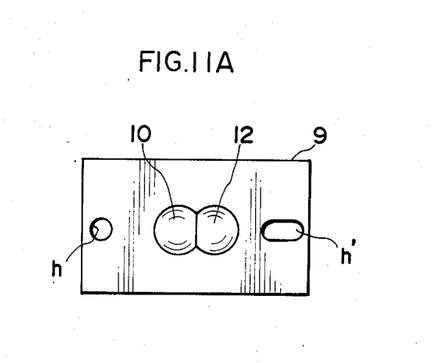
FIGS. 11A and 11B are examples of the plastic plate 9 modified from that of the structure of the first embodiment, respectively.
Figure 11B:
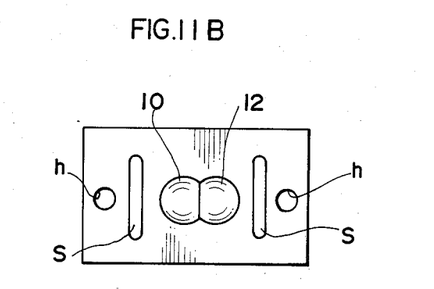

FIG. 11A and 11B show arrangements modified from the above mentioned first embodiment. FIG. 11A shows an arrangement in which one of the boss receiving holes in the plate 9 is made into a slotted hole h' elongated in the direction in which the lens elements 10, 12 are lined up, whereby the plate is allowed to freely slide in contact with the boss B while its vertical movement vertical to that direction is restricted thereby, and only the other boss B and boss receiving hole h are used to fix the plate to the base body with the adhesive A in the same manner as in the above mentioned embodiment. FIG. 11B shows another arrangement in which the plate 9 as used in the embodiment of FIGS. 4 to 6 is formed with vertically extended slits S, S between the boss holes h, h and the lens elements 10, 12, whereby the portions engaged with the bosses B, B are allowed to readily make elastic deformation so that the resistance to the expansion and contraction of the plate 9 due to thermal expansion is further lessened. These modified arrangements make it possible to support the plate 9 in a state further freer than that in the embodiment of FIGS. 6 to 8.

Figures 12, 13:
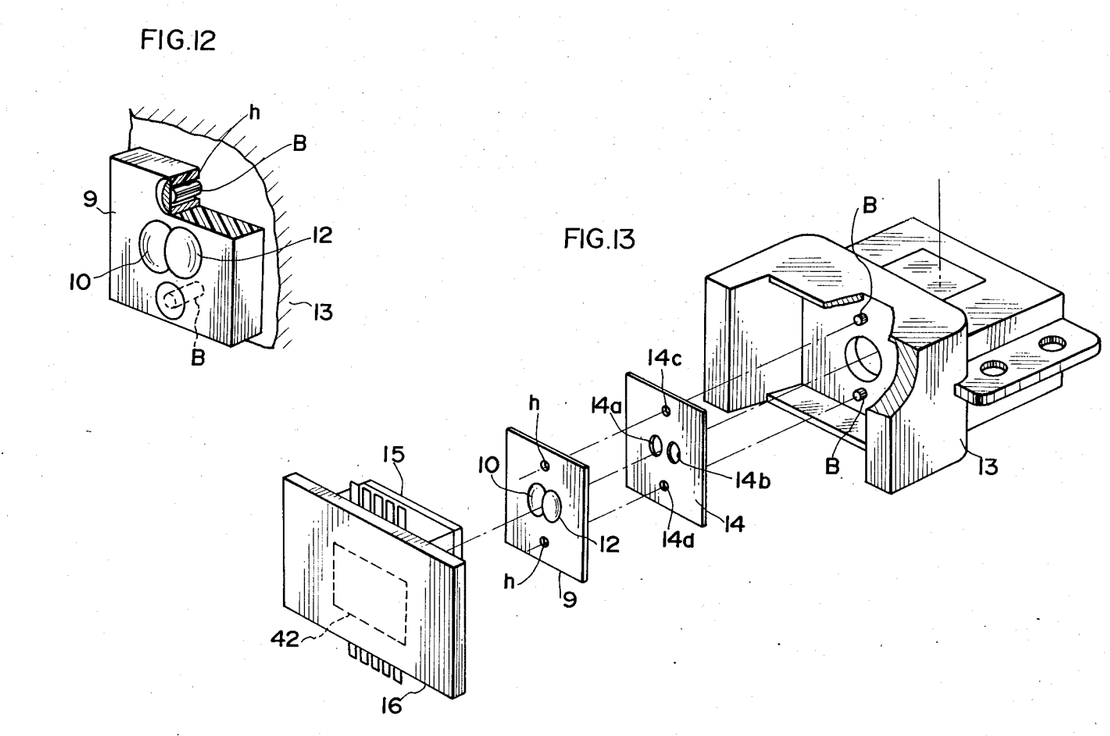
Figure 14:
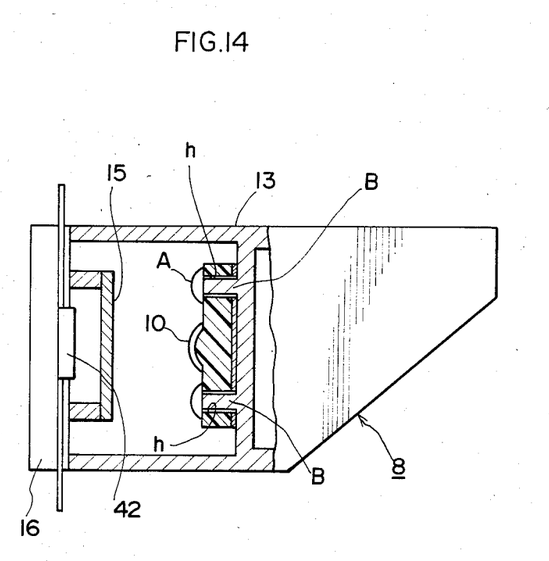

FIGS. 12 and 14 show a lens elements supporting structure according to the second embodiment of the invention applied to the focus detecting unit 8 in FIG. 1. Referring to FIG. 13, the plate 9 is formed with two boss receiving holes h, h at portions thereof disposed on the perpendicular bisector of the line segment connecting the centers of the lens elements 10 and 12. Corresponding to these boss receiving holes, there are formed bosses B, B on the side of the base body 13. The adhesive A is applied to the top ends of the bosses B, B and the surface of the plate 9 formed with the lens elements 10, 12 with the surface of the plate 9 kept flush with the top ends of the bosses, as shown in FIG. 14. In the case of this second embodiment, the boss receiving holes h, h are located at both sides of the line segment connecting the centers of the lens elements 10, 12, so that freedom for the plate 9 to expand and contract in the direction in which the lens elements 10, 12 are lined up is increased as compared with the first embodiment in which the boss receiving holes h, h are arranged along the direction in which the lens elements 10, 12 are lined up. Accordingly, accuracy of the focus detection is further improved in this second embodiment.

What is claimed is:

1. A supporting structure for supporting a pair of lens elements formed of a transparent plastic material on a base body, comprising:
    a plastic plate member formed of the plastic material integrally with said lens elements and formed with at least one through-hole which penetrates the opposite plate surfaces of said plastic plate member;
    at least one projection carried on said base body and loosely fitted in said through-hole with one of the opposite plate surfaces of said plastic member facing said base body; and
    an adhesive applied to the top end of said projection and to the other of the opposite plate surfaces of said plastic plate member which does not face said base body.

2. A supporting structure as defined in claim 1, wherein said adhesive is of the type hardened by irradiation of a ultraviolet light ray.

3. A supporting structure as defined in claim 1, wherein the coefficient of linear thermal expansion of said adhesive is almost equal to that of said plastic material forming said plastic plate member and said lens elements.

4. A supporting structure as defined in claim 3, wherein said adhesive is made of a modified accrylic system resin while said plastic material forming said plastic plate member and said lens elements is an acrylic resin or a polycarbonate resin.

5. In a focus detection device which includes a pair of image forming lens elements for formation of images sensed for focus detection, a supporting structure for support of said lens elements, comprising:

a plastic plate member formed of a transparent plastic material and having said lens elements as a part thereof, said plastic plate member being formed with first and second throughholes which penetrate the opposite plate surfaces of said plastic plate member;

a base body having first and second projections loosely fitting in said first and second throughholes, respectively, with one of said opposite plate surfaces of said plastic plate member facing said base body; and an adhesive applied to at least one of the top ends of said first and second projections and to the other of said opposite plate surfaces of said plate member which does not face said base body.

6. A supporting structure as defined in claim 5, wherein said first and second through-holes are arranged along the direction in which said lens elements are lined up.

7. A supporting structure as defined in claim 6, wherein said adhesive is not applied to the top end of said second projection and said second through-hole is elongated in said direction in which said lens elements are lined up.

8. A supporting structure as defined in claim 6, wherein said plastic plate member is further formed with first and second slits located between said first and second throughholes and said lens elements and extending perpendicularly to said direction in which said lens elements are lined up.

9. A supporting structure as defined in claim 5, wherein said first and second through-holes are formed at positions spaced from said lens elements perpendicularly to the direction in which said lens elements are lined up.

10. A supporting structure as defined in claim 9, wherein said first and second through-holes are disposed on the perpendicular bisector of the line segment connecting the centers of said lens elements.

11. A supporting structure as defined in claim 5, wherein said adhesive is of the type hardened by irradiation of a ultraviolet light ray.

12. A supporting structure as defined in claim 5, wherein the coefficient of linear thermal expansion of said adhesive is almost equal to that of said plastic material forming said plastic plate member and said lens elements.

13. A supporting structure as defined in claim 12, wherein said adhesive is made of a modified acrylic system resin while said plastic material forming said plastic plate member and said lens elements is an acrylic resin or polycarbonate resin.

* * * * *

UNITED STATES PATENT AND TRADEMARK OFFICE
CERTIFICATE OF CORRECTION

PATENT NO. : 4,662,735

DATED : May 5, 1987

INVENTOR(S) : Toshihiko Karasaki et al.

It is certified that error appears in the above-identified patent and that said Letters Patent is hereby corrected as shown below:

On the Title Page:

[30] Foreign Application Priority Data

January 16, 1985   [JP]   Japan ............ 60-6541

January 16, 1985   [JP]   Japan ............ 60-6542

In column 3, line 24, replace "surface" with --surfaces--

In column 4, line 2, replace "changes" with --change--

In column 4, line 8, replace "structre" with --structure--

In column 4, line 15, delete "while"

In column 4, line 35, delete the "." after "14"

In column 4, line 54, delete "a" and insert --the--

In column 5, line 34, after "in" insert --a space--

In column 5, line 48, after "Fig." insert --2--

In column 6, line 67 to column 7, line 3, cancel and insert

--4. A supporting structure as defined in claim 3, wherein said adhesive is made of a modified acrylic system resin while said plastic material forming said plastic plate member and

UNITED STATES PATENT AND TRADEMARK OFFICE
CERTIFICATE OF CORRECTION

PATENT NO. : 4,662,735    Page 2 of 2

DATED : May 5, 1987

INVENTOR(S) : Toshihiko Karasaki et al.

It is certified that error appears in the above-identified patent and that said Letters Patent is hereby corrected as shown below:

said lens elements is an acrylic resin or a polycarbonate resin.--

This Certificate supersedes Certificate of Correction issued July 28, 1987.

Signed and Sealed this

Seventeenth Day of November, 1987

Attest:

DONALD J. QUIGG

Attesting Officer    Commissioner of Patents and Trademarks